(12) United States Patent
Nakagawa (10) Patent No.: US 6,922,304 B2
(45) Date of Patent: Jul. 26, 2005

(54) POSITIONING CONTROL DEVICE (75) Inventor: Shinsuke Nakagawa, Tsuchiura (JP)

(73) Assignee: Hitachi, Ltd., Tokyo (JP)

( * ) Notice: Subject to any disclaimer, the term of this patent is extended or adjusted under 35 U.S.C. 154(b) by 153 days.

(21) Appl. No.: 10/635,545

(22) Filed: Aug. 7, 2003

(65) Prior Publication Data
US 2004/0080863 A1 Apr. 29, 2004

(30) Foreign Application Priority Data
Oct. 24, 2002 (JP) ........................................ 2002-309437

(51) Int. Cl.⁷ ............................................. G11B 5/596
(52) U.S. Cl. .................... 360/77.08; 360/77.04
(58) Field of Search .................... 360/77.08, 77.04, 360/77.02, 67, 78.04, 78.09, 78.14

(56) References Cited

U.S. PATENT DOCUMENTS

| | | | | |
|---|---|---|---|---|
| 5,305,159 A | * | 4/1994 | Sakai et al. | 360/77.02 |
| 5,815,338 A | * | 9/1998 | Tsunekawa et al. | 360/77.04 |
| 5,822,144 A | * | 10/1998 | Takahashi | 360/67 |
| 6,172,838 B1 | * | 1/2001 | Ohba | 360/77.04 |
| 6,320,718 B1 | * | 11/2001 | Bouwkamp et al. | 360/77.04 |
| 6,421,198 B1 | * | 7/2002 | Lamberts et al. | 360/77.04 |
| 6,556,367 B2 | * | 4/2003 | Takahashi | 360/67 |
| 6,751,046 B1 | * | 6/2004 | Szita et al. | 360/77.04 |
| 6,760,185 B1 | * | 7/2004 | Roth et al. | 360/77.08 |
| 6,768,609 B2 | * | 7/2004 | Heydt et al. | 360/77.08 |

* cited by examiner

Primary Examiner—David Hudspeth
Assistant Examiner—Fred F. Tzeng
(74) Attorney, Agent, or Firm—Antonelli, Terry, Stout & Kraus, LLP

(57) ABSTRACT

In a positioning control apparatus, a distance between an actual position at which absolute values of N and Q head positioning signals whose amplitudes vary cyclically in accordance with a position of a magnetic head and whose phases are different from each other by 90 degrees are equal to each other and an optimum position at which the absolute values of N and Q head positioning signals should be equal to each other is calculated from a deviation of an actual position of the magnetic head with respect to a target value of zero which deviation is obtained when controlling the magnetic head to be positioned at a boundary between ranges in which the N and Q head positioning signals have respective linearities so that the absolute values of N and Q head positioning signals become equal to each other.

21 Claims, 8 Drawing Sheets

FORMULAS FOR CALCULATING
POSITIONAL SIGNAL ON LEARNING
    (a) : pos = − Npos − Qpos
    (b) : pos = Npos − Qpos
    (c) : pos = Npos + Qpos
    (d) (d') : pos = − Npos + Qpos

POSITIONING CONTROL DEVICE

BACKGROUND OF THE INVENTION

The present invention relates to a device for controlling a magnetic head positioning in a magnetic recording disk apparatus, particularly an operation of a writing and/or reading head for recording and reproducing data to be positioned at a designated recording track.

In a prior art magnetic head positioning control device as disclosed by JP-A-06-243608, a gain Kp of a positioning control servo-system is adjusted in accordance with a change in track pitch so that an error caused by the change in track pitch in detecting a head position and head velocity is restrained.

In a prior art magnetic head positioning control device as disclosed by U.S. Pat. No. 6,097,565, a radial runout data of circular tracks is obtained, the data is filtered, the filtered data is subtracted from a position error signal to obtain a corrected position error signal, and the corrected position error signal is used to control a head actuator servo system.

BRIEF SUMMARY OF THE INVENTION

An object of the present invention is to provide a device for controlling a magnetic head positioning in a magnetic recording disk apparatus in which a position of the magnetic head can be correctly measured over the whole of movable range of the magnetic head.

In a positioning control apparatus for controlling a movement of a movable object to be positioned at a target position on a surface while estimating an actual position of the movable object on the surface on the basis of signals (set including Vn and Vq or set including Npos and Qpos) which signals are generated by the movable object and a value of each of which signals varies in accordance with a distance between the movable object and respective one of positional marks (A-B phases boundary, C-D phases boundary) of at least two phases which are distant from each other on the surface, comprising, an object driver for driving the movable object to be positioned at the target position on the surface, and a sensor to be included by the movable object to generate the signals, the surface includes a first range in which the actual position of the movable object is adapted to be estimated as a distance between the movable object and first one of the positional marks and a second range in which the actual position of the movable object is adapted to be estimated as a distance between the movable object and second one of the positional marks, and a distance data on the basis of which distance data an actual distance between the first one of the positional marks and the second one of the positional marks varying in accordance with a positional error in writing the positional marks onto the surface (that is, an error in positioning a positional mark writing or recording device with respect to the surface during writing the positional marks onto the surface) is adapted to be estimated is recorded in the positioning control apparatus.

Since the distance data (measurable from the signals (Vn, Vq; Npos, Qpos) which are generated by the movable object and each of which corresponds to the distance between the movable object and respective one of the positional marks (A-B phases boundary, C-D phases boundary)) on the basis of which distance data the actual (not nominal or optimum) distance between the first one of the positional marks and the second one of the positional marks is estimated is recorded in the positioning control apparatus, a position of the movable object with respect to at least one of the positional marks on the surface is correctly calculated as a solid line 51 on the basis of the distance data, without non-linearity as a dot line 50 caused by the nominal or optimum distance between the first one of the positional marks and the second one of the positional marks.

A positioning control apparatus may further comprises a substrate including the surface to record the distance data in the substrate (preferably in the vicinity of the positional marks) or a memory device to record the distance data in the memory device.

The distance data may correspond to a difference between a nominal or optimum distance between the first one of the positional marks and the second one of the positional marks (which nominal or optimum distance is prevented from being deteriorated by the positional error in writing the positional marks onto the surface) and an actual distance between the first one of the positional marks and the second one of the positional marks; a combination (or sum) of an actual distance between the first one of the positional mark and a boundary between the first and second ranges and an actual distance between the second one of the positional mark and the boundary between the first and second ranges; an actual distance between one of the positional marks and a boundary between the first and second ranges when the boundary is set in such a manner that a distance between the first one of the positional mark and the boundary and a distance between the second one of the positional mark and the boundary are equal to each other; or twice an actual distance between one of the positional marks and a boundary between the first and second ranges when the boundary is set in such a manner that a distance between the first one of the positional mark and the boundary and a distance between the second one of the positional mark and the boundary are equal to each other.

When the distance data includes a component corresponding to an actual distance between one of the positional marks and a boundary between the first and second ranges, the component may correspond to the value of one of the signals which value is variable in accordance with the distance between the movable object and the one of positional marks and is obtainable when the target position at which the movable object is positioned is the boundary, or to an average of the values of one of the signals each of which values is variable in accordance with the distance between the movable object and the one of positional marks and is obtainable at respective one of a plurality of times of generating the one of the signals (that is, passing repeatedly the boundary or the vicinity of the boundary to generate the one of the signals by the plurality of times) when the target position at which the movable object is positioned is the boundary and the movable object passes repeatedly the boundary or the vicinity of the boundary by the plurality of times.

The distance data may correspond to an actual distance between one of the positional marks and a boundary between the first and second ranges when the boundary is set in such a manner that an absolute value of one of the signals and an absolute value of the other one of the signals become equal to each other when the target position at which the movable object is positioned is the boundary, or to twice an actual distance between one of the positional marks and a boundary between the first and second ranges when the boundary is set in such a manner that an absolute value of one of the signals and an absolute value of the other one of the signals become equal to each other when the target position at which the movable object is positioned is the boundary.

The distance data may correspond to a combination (or sum) of actual distances between the first one of the positional mark and the movable object and between the second one of the positional mark and the movable object measurable when the target position at which the movable object is positioned is set between the first one of the positional mark and the second one of the positional mark to generate the signals, values of which signals vary respectively in accordance with the actual distances between the first one of the positional mark and the movable object and between the second one of the positional mark and the movable object so that the actual distances between the first one of the positional mark and the movable object and between the second one of the positional mark and the movable object measurable are measurable from the signals respectively. In this case, the target position at which the movable object is positioned may be a boundary between the first and second ranges. The boundary may be set in such a manner that an absolute value of one of the signals and an absolute value of the other one of the signals become equal to each other at the boundary. Each of the actual distances may be determined on the basis of an average of the values of respective one of the signals each of which values is variable in accordance with the distance between the movable object and respective one of positional marks and is obtainable at respective one of a plurality of times of generating the respective one of the signals (that is, passing repeatedly the boundary or the vicinity of the boundary to generate the respective one of the signals by the plurality of times) when the target position at which the movable object is positioned is the boundary between the first and second ranges and the movable object passes repeatedly the boundary or the vicinity of the boundary by the plurality of times.

In a positioning control apparatus comprising a position error signal calculating device for calculating from signals generated by a magnetic head a positional signal corresponding to a positional relationship between a positional mark prerecorded on a magnetic disk and the magnetic head for recording information onto the magnetic disk or reading out the information from the magnetic disk and a position error signal corresponding to a difference between an actual position of the magnetic head and a target position of the magnetic head, an operating value calculating device for calculating an operating value on the basis of the position error signal, and a positioning device for positioning the magnetic head at the target position on the basis of the operating value, according to the invention, the positioning control apparatus further comprises a boundary position calculating device for calculating a distance between actual and optimum positions at which absolute values of N and Q head positioning signals whose amplitudes vary cyclically in accordance with the position of the magnetic head and whose phases are different from each other by 90 degrees are equal to each other, from a deviation of the position of magnetic head to a target value, where the head position is obtained by the sum or subtraction of values of N and Q head positioning signals. Therefore, a position of the magnetic head can be correctly measured over the whole of movable range of the magnetic head.

An estimated value of the boundary position may be read out as the prerecorded distance between the actual and optimum positions at which the absolute values of N and Q head positioning signals are equal to each other when the positioning device positions the magnetic head in the range in which the N head positioning signal has the linearity, a distance between a N-zero position at which the N head positioning signal is zero and a Q-zero position which is adjacent to the N-zero position and at which the Q head positioning signal is zero is calculated from the estimated value of said boundary position, and the positioning signal for said head may be compensated by the distance between the N-zero position and the Q-zero position.

A distance between the N-zero position at which the N head positioning signal is actually zero and an optimum N-zero position at which the N head positioning signal is zero may be calculated from a deviation which is obtained when positioning the magnetic head to the N-zero position as the target value, the distance between the N-zero position and the Q-zero position adjacent to the N-zero position may be calculated from the distance between the N-zero position and the optimum N-zero position and the estimated value of the boundary position, and the positioning signal for the head may be compensated by the distance between the N-zero position and the Q-zero position adjacent to the N-zero position.

The boundary position calculating device may calculate the distance between the actual position at which the absolute values of N and Q head positioning signals are equal to each other and the optimum position at which the absolute values of N and Q head positioning signals should be equal to each other, with performing at least one of band-pass filtering treatment and band-stop filtering treatment on the deviation of the actual position of the magnetic head with respect to the target value of zero which deviation is obtained when controlling the magnetic head to be positioned at the boundary between the ranges in which the N and Q head positioning signals have respective linearities so that the absolute values of N and Q head positioning signals become equal to each other.

The boundary position calculating device may calculate a total amount of the distance between the actual position at which the absolute values of N and Q head positioning signals are equal to each other and the optimum position at which the absolute values of N and Q head positioning signals should be equal to each other, and deviations of averaged absolute values of the N and Q head positioning signals with respect to one fourth of a track width which N and Q head positioning signals are obtained when controlling the magnetic head to be positioned at the boundary between the ranges in which the N and Q head positioning signals have respective linearities so that the absolute values of N and Q head positioning signals become equal to each other.

In a positioning control apparatus comprising, a position error signal calculating device for calculating from signals generated by a magnetic head a positional signal corresponding to a positional relationship between a positional mark prerecorded on a magnetic disk and the magnetic head for recording information onto the magnetic disk or reading out the information from the magnetic disk and a position error signal corresponding to a difference between an actual position of the magnetic head and a target position of the magnetic head, an operating value calculating device for calculating an operating value on the basis of the position error signal, and a positioning device for positioning the magnetic head at the target position on the basis of the operating value, according to the invention, the positioning control apparatus may further comprise a position calculating device for calculating a radial position of the magnetic head on the magnetic disk from N and Q head positioning signals whose amplitudes vary cyclically in accordance with the position of the magnetic head and whose phases are different from each other by 90 degrees, wherein a first distance between an actual position at which N head positioning signal is zero and an optimum position at which N head positioning signal should be zero is calculated from a deviation of an actual position of the magnetic head with respect to a first target position at which N head positioning signal is zero while the deviation is obtained when the magnetic head is controlled to be positioned at the target position, a second distance between an actual position at which Q head positioning signal is zero adjacently to the actual position at which N head positioning signal is zero and an optimum position at which Q head positioning signal should be zero is calculated from a deviation of an actual position of the magnetic head with respect to a second target position at which Q head positioning signal is zero while the deviation is obtained when the magnetic head is controlled to be positioned at the second target position, a compensating distance between the actual position at which N head positioning signal is zero and the actual position at which Q head positioning signal is zero adjacently to the actual position at which N head positioning signal is zero is calculated from the first and second distances, and the positional signal of the magnetic head is compensated with using the compensating distance.

Other objects, features and advantages of the invention will become apparent from the following description of the embodiments of the invention taken in conjunction with the accompanying drawings.

DETAILED DESCRIPTION OF THE INVENTION

Figure 1:
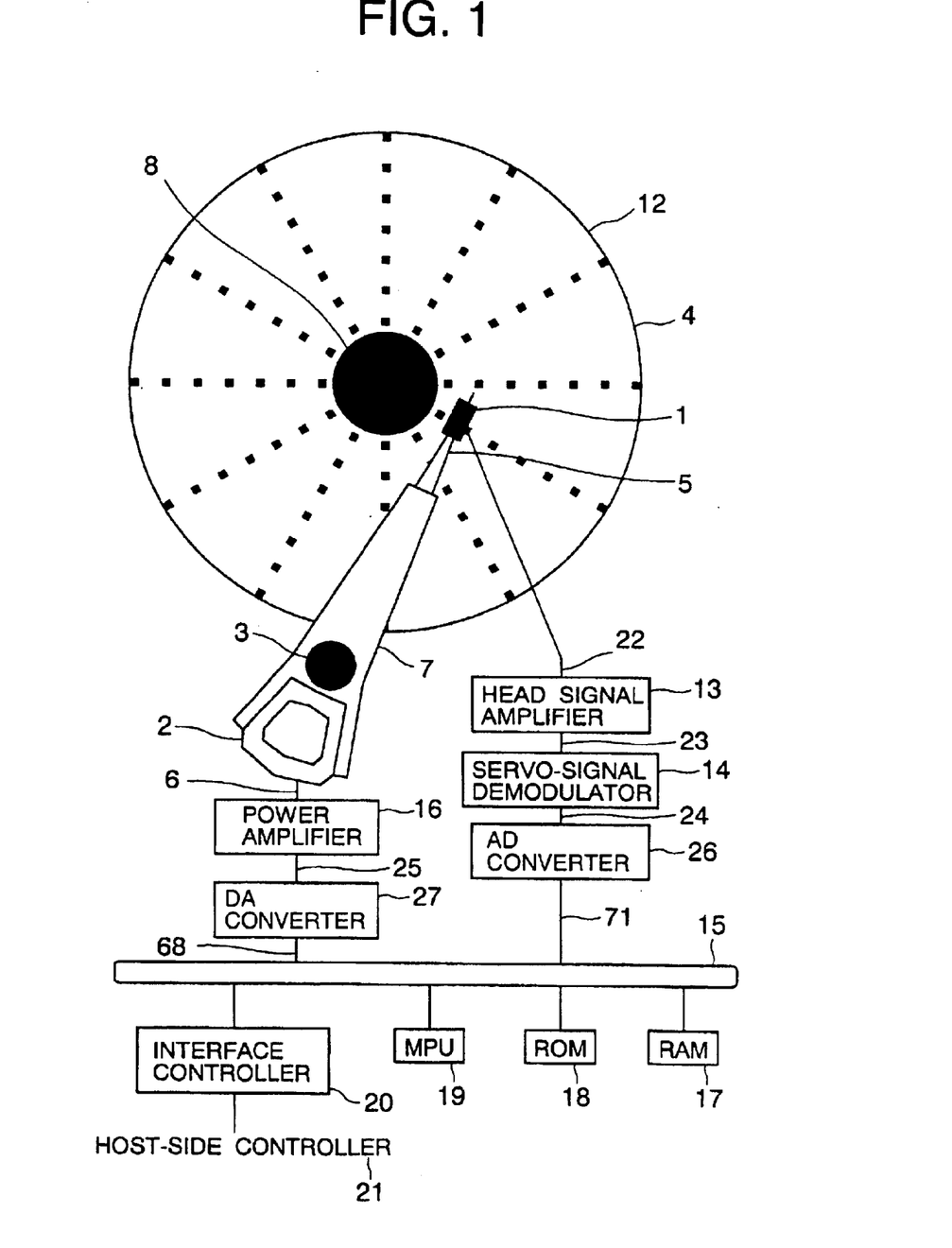
FIG. 1 is a schematic view showing a magnetic head positioning control system for a magnetic recording disk apparatus including a magnetic head positioning control device of the invention.

In a magnetic head positioning control system as shown in FIG. 1, a spindle motor 8 rotatable at a predetermined velocity is fixed to a base (not shown). A magnetic disk 4 as a recording medium is fixed to the spindle motor 8. A head actuator for positioning a magnetic head 1 includes a head supporting spring 5, a carriage 7, a pivot bearing 3 and a voice coil motor (VCM) 2.

The pivot bearing 3 is parallel to a spindle motor shaft at a side of the magnetic disk 4 held by the spindle motor 8. The head supporting spring 5 and the carriage 7 are supported on the pivot bearing 3 in a rotatable manner. A driving force for moving the magnetic head is generated by the voice coil motor (VCM) 2. A driving coil of the voice coil motor 2 is fixed to the carriage 7.

A control unit includes a head signal amplifier 13, a servo signal demodulator 14, an AD converter 26, an MPU 19, a ROM 18 storing programs executed by the MPU 19 and parameters required in various controls, a Ram 17, an interface controller 20 for outputting an access requirement of reading out and/or writing to the MPU 19 in response to a command of a host-side controller 21, a DA converter 27, a power amplifier 16 for controlling an electric current to drive the actuator, and a bus 15.

The control unit is a position error signal calculating device and an operating value calculating device, and the head actuator is a positioning control device.

A servo information is recorded in servo sectors 12 arranged radially on the disk medium. When the disk is rotated at a constant velocity, a positional information is read out by the head 1 from the servo sectors at a constant interval. The servo information 22 read out by the head 1 is amplified by the head signal amplifier 13, and subsequently supplied into the servo signal demodulator 14 as a head output signal 23. The servo signal demodulator 14 demodulates a track number and amplitude signal 24.

The AD converter 26 converts the track number and amplitude signal 24 to a digital signal. The MPU 19 produces a positional signal on the basis of a demodulated signal 71, performs a filtering calculation for controlling to follow a target, and calculates digitally an operating signal 68 to be output to the DA converter 27.

The DA converter 27 converts the digital operating signal to an analog operating signal 25 to be output to the power amplifier 16. The power amplifier 16 drives the voice coil motor (VCM) 2 to position the magnetic head onto a target track.

Figure 6:
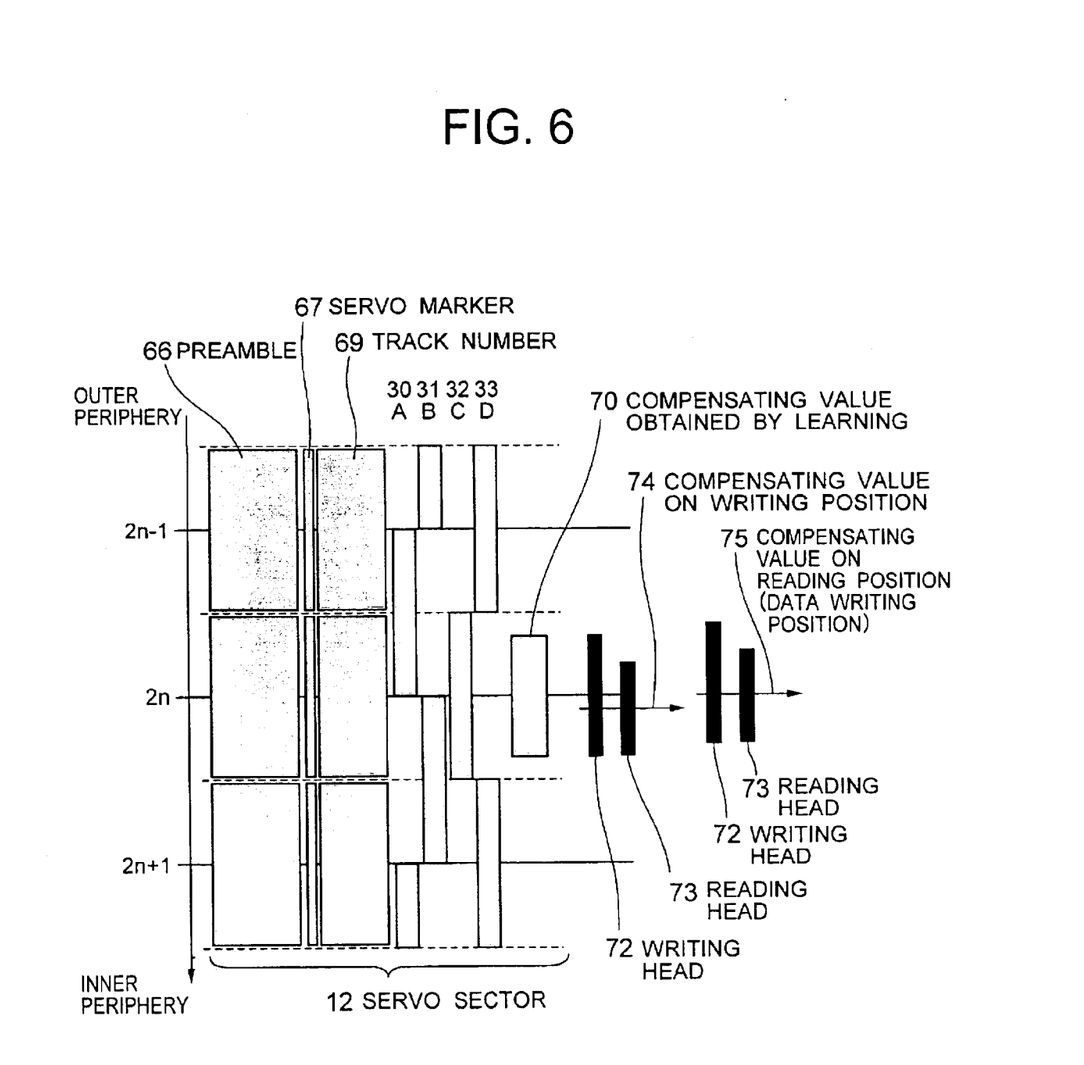
FIG. 6 is a schematic view showing a recording manner of the result of learning on the position of the switching boundary between N and Q phases to be read out from a servo sector.

Signals recorded in the servo sector 12 as shown in FIG. 6 are read out by the magnetic head 1. In FIG. 6, a horizontal direction corresponds to a circumferential direction of the disk, and a vertical direction corresponds to a radial direction of the disk. In the servo sector 12 on the magnetic disk, a preamble 66, a servo-marker 67, a track number 69, burst signals 30–33 are aligned in order to be read out by the magnetic head 1 along the circumferential direction. The magnetic head 1 has a writing head for recording data and a reading head for reading out the data so that the read head reads out sequentially the information recorded in the servo sector when passing it.

An amplitude read out by the read head depends on a length along which the head and the recorded signal overlap each other in the radial direction. Therefore, when passing the preamble 66, the read out amplitude becomes maximum, because the magnetic head and the recorded signal overlap each other entirely. On the basis of this maximum read out amplitude, a gain on reading out the burst signals 30–33 is adjusted. A trigger signal for detecting the track number 69, burst signals and so forth is produced from the servo marker 67. The track number 69 is for recording in gray code a track number indicating a position of track in the radial direction of the disk. An amplitude of the signal read out when the magnetic head passes the burst signals 30–33 depends on the length along which the head and the recorded signal overlap each other in the radial direction. The amplitude of the signal read out when the magnetic head passes each of the burst signals 30–33 changes in accordance with a position of the magnetic head on the burst signals 30–33.

The signals on the servo sector as shown in FIG. 6 are recorded by the magnetic head performing a servo signal writing operation. When performing the servo signal writing operation, the magnetic head actuator is shifted in incremental steps of a desired pitch with detecting a rotational angle of the actuator by an external measuring system so that the writing head 72 writes the signals onto the servo sector 12. In this case, the pitch is one half of a recording track width so that centers of tracks 2n−1, 2n, 2n+1 and boundaries between the tracks adjacent to each other, in other words, boundaries between A and B burst signals and boundaries between C and D burst signals, are defined. The positions of these boundaries are determined by a scanning path of the writing head when performing the servo signal writing operation, and the boundaries should be arranged on respective perfect circles under optimum condition. Actually, because of wind effect, vibration of the disk and vibration of the bearing when performing the servo signal writing operation, the circumferentially distributed boundaries between the A and B burst signals and the circumferentially distributed boundaries between the C and D burst signals are not along the perfect circles respectively.

Figure 2:
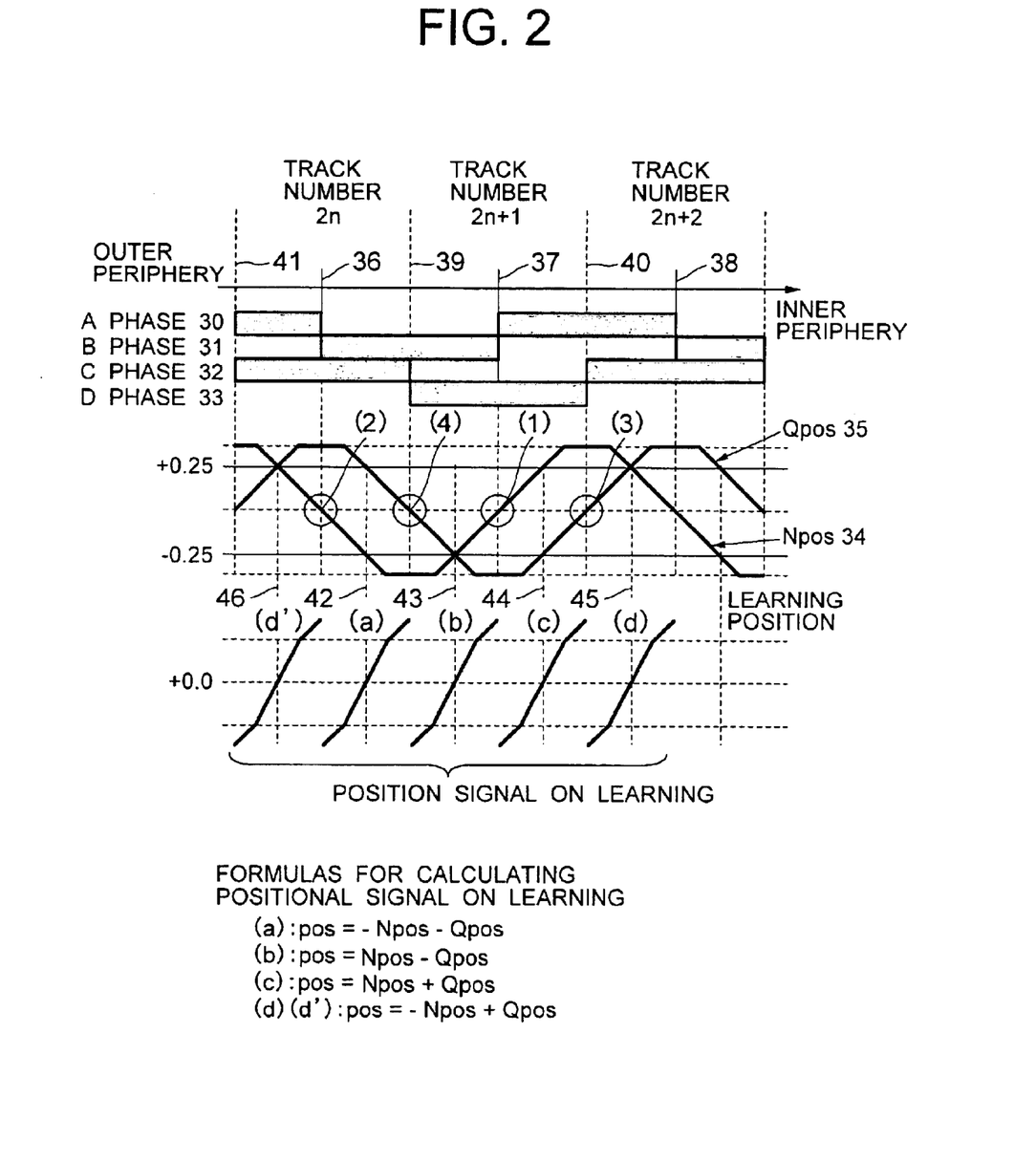
FIG. 2 is schematic view showing a relationship between recording track arrangement and two-phases signals N and Q produced from four-phases burst signals.

For defining a radial position on the whole surface of the disk, a linearized positional signal (Linpos) determined on two phase signals N and Q produced from the track number and the four burst signals as shown in FIG. 2 is used. The linearized positional signal (Linpos) is composed of an integer corresponding to the track number and fractions below decimal point which corresponds to a position in respective track and is produced from the N and Q phase signals.

In FIG. 2, a horizontal direction corresponds to the radial direction, and the track number changes as 2n, 2n+1, 2n+2 - - - from an outer periphery toward an inner periphery. The magnetic head scans the recorded signals from upper side to lower side in FIG. 2 so that the magnetic head reads out the recorded signals in order of A phase 30, B phase 31, C phase 32 and D phase 33.

FIG. 2 is formed under the following assumptions for explaining a producing method of the linearized position signal.
(Assumption 1) Distances between A-B phases boundaries and C-D phases boundaries are constant. That is, the writing of the servo signal is performed under an optimum condition of no vibration.
(Assumption 2) A radial width of the reading head 73 of the magnetic head 1 is smaller than the track pitch (distance between track centers adjacent to each other), and greater than one half of the track pitch.
(Assumption 3) An output sensitivity of the read head is constant in the radial direction. That is, if a radial length of the recorded signal is extremely small, the amplitude of the output signal is constant irrespective of the position of the magnetic head when the magnetic head passes on the recorded signal.

The amplitudes Va (produced from A phase), Vb (produced from B phase), Vc (produced from C phase) and Vd (produced from D phase) of the read out signals of the magnetic head 1 are obtained under the above assumptions 1–3 when the head passes circumferentially the A-D phases. N phase output signal Vn=the amplitude Va−the amplitudes Vb, and Q phase output signal Vq=the amplitude Vc−the amplitudes Vd.

N phase signal Npos 34 and Q phase signal Qpos 35 are shown in FIG. 2. An output value change of each of the N phase signal Npos 34 and Q phase signal Qpos 35 is shown vertically in FIG. 2, and the output value of each of the N phase signal Npos 34 and Q phase signal Qpos 35 changes in accordance with a radial position of a center of the head. The N phase signal Npos 34 is zero when the head passes the A-B phases boundary, and the Q phase signal Qpos 35 is zero when the head passes the C-D phases boundary. An absolute value of the N phase output signal Vn is equal to that of the Q phase output signal Vq when the head passes a center between the track center 36, 37, 38 and the phase boundary 39, 40, 41, that is, a position distant from the track center 36, 37, 38 and the phase boundary 39, 40, 41 by one fourth of the track width.

Since the amplitudes of the N phase output signal Vn and Q phase output signal Vq change in accordance with the output sensitivity of the head, a scaling of the N phase output signal Vn and Q phase output signal Vq is performed by multiplying each of the N phase output signal Vn and Q phase output signal Vq by a compensating gain Kp so that the N phase output signal Vn and Q phase output signal Vq correspond to a radial position of the head when detecting the N phase output signal Vn and Q phase output signal Vq.

The gain Kp is determined in such a manner that when a value indicating the track width is imaginarily set to 1 and the absolute values of the N and Q phase output signals Vn and Vq are equal to each other, a product of each of the absolute values of the N and Q phase output signals Vn and Vq and the gain Kp is 0.25, because, as described above, the absolute value of the N phase output signal Vn is equal to that of the Q phase output signal Vq when the head passes the center between the track center 36, 37, 38 and the phase boundary 39, 40, 41, that is, the position distant from the track center 36, 37, 38 and the phase boundary 39, 40, 41 by one fourth (0.25) of the track width (1).

The N phase signal Npos 34 and Q phase signal Qpos 35 are determined along the following formulas.

$$Npos = Kp*(Va-Vb) \quad \text{(formula 1)}$$

$$Qpos = Kp*(Vc-Vd) \quad \text{(formula 2)}$$

FIG. 2 shows a relationship between the track number and each of Npos and Qpos. By multiplying by the gain Kp, a position at which Npos and Qpos become 0.25 or −0.25 is distant from the track center 36, 37, 38 by 0.25 (one fourth of the track width). The N phase signal Npos 34 and Q phase signal Qpos 35 change linearly with respect to the radial position of the head in the vicinity of the respective positions at which Npos and Qpos become zero respectively, under the above assumptions 1 and 3. The changes of Npos and Qpos are saturated in the vicinity of the respective positions of the boundary 39, 40, 41 between the recording tracks adjacent to each other and the center 36, 37, 38 of the recording track. The linearized positional signal is produced from the N phase signal Npos 34 at the vicinity of and at the center 36, 37, 38 of the recording track, and is produced from the Q phase signal Qpos 35 at the vicinity of and at the boundary 39, 40, 41 between the recording tracks adjacent to each other so that an accuracy of the linearized positional signal is prevented from being deteriorated by the saturation of the changes of Npos and Qpos.

The compensating gain Kp is determined as follows. The magnetic head is positioned to a learning position 42(a), 43(b), 44(c), 45(d), 46(d') at which the absolute values of Npos and Qpos are equal to each other while measuring the N phase output signal Vn and Q phase output signal Vq. A positional signal pos for positioning the magnetic head at any one of the learning position 42(a), 43(b), 44(c), 45(d), 46(d') is determined in such a manner that it becomes zero at the learning position. By performing a feed back control with –pos (following error with respect to a desired position) and setting the position signal pos obtainable at the desired position at zero, the magnetic head is positioned at the learning position. The positional signal pos for the learning position (a) is determined by a formula of (pos=–Npos–Qpos), the positional signal pos for the learning position (b) is determined by a formula of (pos=Npos–Qpos), the positional signal pos for the learning position (c) is determined by a formula of (pos=Npos+Qpos), and the positional signal pos for the learning position (d), (d') is determined by a formula of (pos=–Npos+Qpos), so that the positional signal pos becomes zero when the head is correctly follow the learning position.

When the magnetic head is positioned at the learning position by using the positional signal pos, absolute values |Vn_ave|, |Vq_| ave of averages of the N phase output signal Vn and Q phase output signal Vq along a circumference of the recording track are measured to determine the compensating gain Kp along the below formula 3. By utilizing the averages of the N phase output signal Vn and Q phase output signal Vq along the circumference of the recording track, differences in radial position of the track center and boundary among the sectors formed by disturbance (vibration) when writing the servo information are averaged to eliminate an affect of the disturbance. The N phase output signal Vn and Q phase output signal Vq are averaged by summing absolute values of each of the N phase output signal Vn and Q phase output signal Vq obtained at measuring points, and subsequently dividing a total amount of the absolute values of each of the N phase output signal Vn and Q phase output signal Vq by a total number of the measuring points. The formula 3 is based on that the meaning of Kp (a position at which the absolute values of N phase output signal Vn and Q phase output signal Vq are equal to each other is distant from the track center and track boundary by one fourth (0.25) of the track width (1)).

$$Kp=0.5/(|Vn\_ave|+|Vq\_ave|) \qquad \text{(formula 3)}$$

The compensating gain Kp averaged along the circumference of the recording track does not include a component caused by differences (AC variation) in radial position of the track center and boundary among the sectors. If the track pitches averaged respectively along the circumferences of the recording tracks are different from each other (DC variation), the compensating gains Kp determined along the circumferences of the recording tracks respectively are different from each other. Therefore, the compensating gains Kp are determined on respective arrays of the circumferences of the continuously radially juxtaposed recording tracks of total number 20–100, and an averaged compensating gain Kp_ave is obtained as an average value of the compensating gains Kp to restrain the compensating gain from being deteriorated by the local DC variation. At each of radially outer, intermediate and inner areas including the respective arrays of the circumferences of the continuously radially juxtaposed recording tracks of total number 20–100, the averaged compensating gain Kp_ave is obtained.

The linearized positional signal Linpos formed by the track number, Npos and Qpos to measure and define an actual position over the whole recording surface of the disk is explained as below. In FIG. 2, a radial distance between peaks of each of Npos and Qpos adjacent to each other is twice the track pitch, and a radial distance between the peaks of Npos and Qpos adjacent to each other is one half of the track pitch. The linearized positional signal Linpos is determined from the track number, and from the Npos and Qpos signals generated at respective radial ranges in each of which radial ranges the changes in value of respective one of Npos and Qpos signals with respect to the change in radial position of the head is not saturated. For example, when the linearized positional signal Linpos of the recording track 2n is determined, at and in the vicinity of the track center, Linpos=track number–Q. Since the change in value of Qpos signal with respect to the change in radial position of the head is saturated at a radially inner side of the vicinity of the track center, when the magnetic head is positioned at the radially inner side of the vicinity of the track center, that is, the magnetic head is positioned at a radial area of [Npos<–Qpos] radially inner from a point 42, Linpos=track number–N+0.5. When the magnetic head proceeds to a radially inner side of the track boundary 39, the track number changes to 2n+1, and Linpos=track number–N–0.5. Linpos is determined as the following formula 4 in which "track" is the track number of integral number. The position over the whole recording surface of the disk is measured and defined by Linpos.

```
if (Npos≧0)
    if (Qpos≧0)
        if (Npos≧Qpos)
            Lonpos = Qpos − 0.5 + track
        else
            Linpos = −Npos + track
        end
    else
        if (Npos≧−Qpos)
            Lonpos = Qpos + 0.5 + track
        else
            Linpos = Npos + track
        end
    end
else
    if (Qpos≧0)
        if (−Npos≧Qpos)
            Lonpos = −Qpos + 0.5 + track
        else
            Linpos = −Npos + track
        end
    else
        if (Npos≧Qpos)
            Lonpos = Npos + track
        else
            Linpos = −Qpos −0.5 + track
        end
    end
end                    (formula 4)
```

Figure 3:
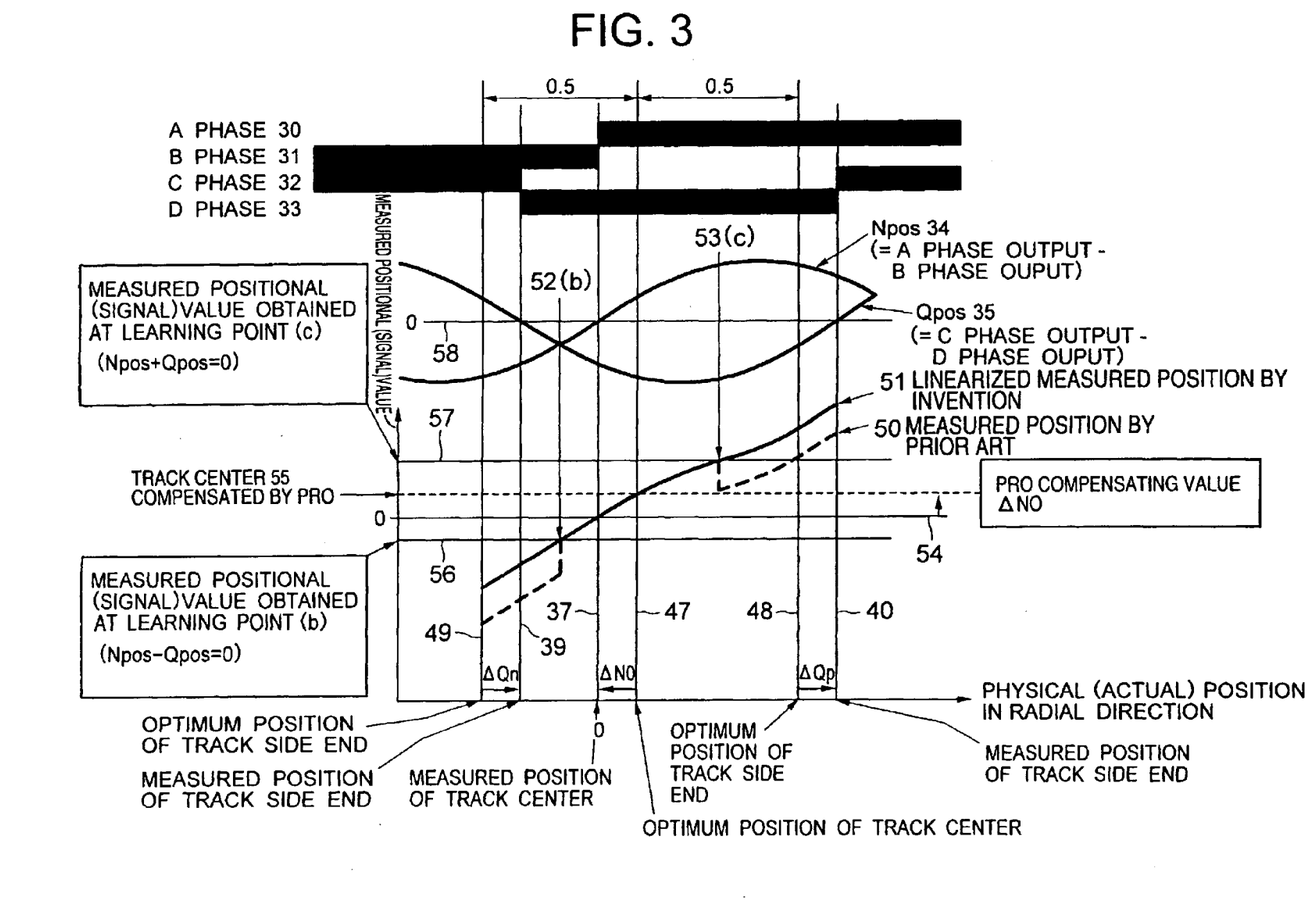
FIG. 3 is a schematic diagram showing a linearized positional signal obtained through learning on a position of a switching boundary between N and Q phases and using a positional signal producing logic.

FIG. 3 shows the linearized positional signal obtainable by learning on a switching boundary between N and Q phases and a positional signal producing logic when the A, B, C and D phases 30–33 are distant from their respective optimum positions.

A boundary 37 between the A and B phases (measured track center) is distant from an optimum position 47 thereof by ΔN0. A boundary 40 between the C and D phases at a radially inner side of the measured track center is distant from an optimum position 48 thereof by ΔQp. A boundary 39 between the C and D phases at a radially outer side of the measured track center is distant from an optimum position 49 thereof by ΔQn.

FIG. 3 includes Npos 34 and Qpos 35 obtained along the formulas 1 and 2. A gradient of tangential line of Npos is maximum at the measured track center 37, and decreases in accordance with a distance of tangential line thereof from the measured track center 37, because of a sensitivity distribution characteristic of the reading head (the sensitivity of the reading head for the magnetized disk decreases from a central position of the head toward an outer periphery thereof). A gradient of tangential line of Qpos is maximum at a position where Qpos=0, because of the same reason.

In this case, the linearized position signal Linpos 50 obtained from Npos 34 and Qpos 35 along the formula 4 is not linear at the switching boundaries 52(*b*) and 53(*c*). That is, when the magnetic head moves toward the inner periphery of the disk, a measured position of the head increases abruptly at the switching boundaries (b) at which the basis of the Linpos calculation is changed from Q phase to N phase, and decreases abruptly at the switching boundaries (c) at which the basis of the Linpos calculation is changed from N phase to Q phase.

According to the invention, a distance between the measured track center (Npos=0) and the measured track side end 40 or 39 (Qpos=0) is learned to obtain the linearized positional signal (Linpos) from the learned distance, the track number and Npos (or Qpos) so that a nonlinearity between actual physical position and the linearized positional signal (Linpos) at the switching boundary 53 (or 52) is prevented. When the position 37 (Npos=0) and the positions 39, 40 (Qpos=0) are distant from respective optimum positions 47, 48, 49 by $\Delta N0$, $\Delta Qn$ and $\Delta Qp$ respectively, how much the switching boundaries 52(*b*) and 53(*c*) are shifted from their optimum distance (one fourth (0.25) of track width (1)) from the measured track center (Npos=0) or the measured track side end (Qpos=0) is estimated (step 1), and a distance between the optimum track center 54 and the measured track side end 40 or 39 is obtained from such estimated shift distance value and $\Delta N0$ (step 2). The such shift distance value between the switching boundary 52(*b*) or 53(*c*) and the optimum position thereof is estimated as follows on the basis of the positional signal pos, when a feed back control is performed in such a manner that the positional signal pos (pos=Npos−Qpos when positioning the head at the switching boundary 52(*b*) as the learning position, pos=Npos+Qpos when positioning the head at the switching boundary 53(*c*) as the learning position) becomes zero to position the head at the switching boundary 52(*b*) or 53(*c*).

Figure 4:
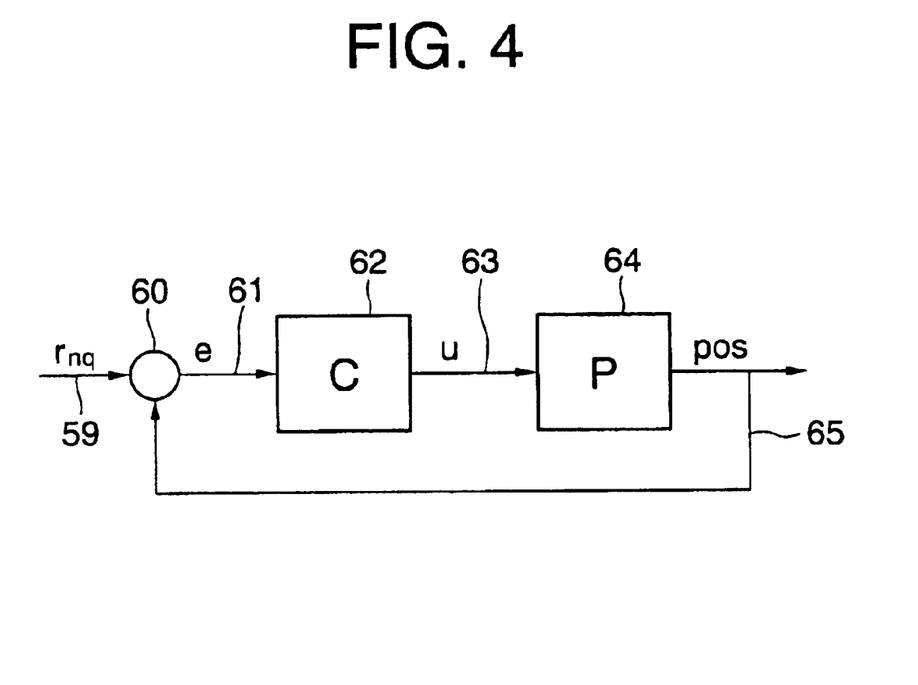
FIG. 4 is a block diagram showing a control system for learning a change in switching position between N and Q phases.

A feed back control system for positioning the head at the switching boundary 52(*b*) is shown in FIG. 4. Reference numeral 64 denotes the head actuator, head position y denotes the head movement on the magnetic disk, and reference numeral 62 denotes the control unit. The positional signal pos (pos=Npos−Qpos) becomes zero when the head is correctly positioned at the switching boundary 52(*b*). Therefore, a target value rnq (59) for positioning the head at the learning position is set at zero and e 61 becomes −pos.

The positional signal pos 65 is detected at each of the servo sectors when the magnetic head is rotated. These positional signals obtained when the magnetic head is rotated by x revolutions are stored to obtain an averaged value of the positional signal (revolution synchronous component) at each of the servo sectors by dividing a total amount of the positional signals obtained at each of the servo sectors by the revolution number x. A following error synchronous component e (k) at each of the servo sectors is a value whose positive-negative sign is inversed with respect to the revolution synchronous component and whose absolute value is equal to that of the revolution synchronous component, when k is a sector indicating numeral for each of the servo sectors.

In FIG. 4, a relationship among rnq (k) 59, e(k) 61 and y (k) 65 calculated by the following formulas is shown. According to this relationship, rnq (k) is obtainable along formula 6.

$$e(k)=\{1+P*C\}^{-1}*rnq(k) \quad \text{(formula 5)}$$

$$rnq(k)=\{1+P*C\}*e(k) \quad \text{(formula 6)}$$

In formula 6, C*e(k) can be replaced by an input u(k) 63, whereby formula 6 may be replaced by formula 7.

$$rnq(k)=e(k)+P*u(k) \quad \text{(formula 7)}$$

Therefore, rnq can be estimated from the measured value e and u along formula 7. For improving an accuracy in estimating rnq, it is preferable that a modeling of P is finely performed or that a value of P*u(k) is made small with respect to a value of e.

For decreasing the value of P*u(k), it is preferable that a gain of the control unit C is decreased to decrease the input u.

On obtaining Npos and Qpos by using the averaged gain Kp_ave as described above, the calculation of rnq are performed under a condition in which an averaged value of distance between the switching boundary 53 (or 52) and the measured track center (Npos=0) or track side end (Qpos=0) along the circumference of the track is one fourth (0.25) of the track width (1). Actually, the averaged value along the circumference of the track is different from the one fourth (0.25) of the track width (1) by $\Delta dc$ because of the vibration when writing the servo track. In this case, simultaneously with detecting the pos 65 when learning, the signals Vn and Vq are detected and stored to obtain the their averaged values |Vn_ave| and |Vq_ave| after learning so that the DC variation $\Delta dc$ of the learning position (whose value is a ratio with respect to the track width when the track width is presumed to be 1) is obtained by the following formula 8.

$$\Delta dc=\{Kp\_ave*(|Vn\_ave|+|Vq\_ave|)/2\}-0.25 \quad \text{(formula 8)}$$

By adding, as the following formula 9, the calculated $\Delta dc$ to the rnq calculated along the formula 7, an accuracy for estimating the rnq is improved.

$$rnq(k)=e(k)+P*u(k)+\Delta dc \quad \text{(formula 9)}$$

The rnq can be learned at the learning position 53(*c*) in the substantially same manner as being performed in the learning position 52(*b*), while the pos 65 is calculated by pos=Npos+Qpos. The rnq_b as the rnq obtained at the learning position 52(*b*) and the rnq_c as the rnq obtained at the learning position 53(*c*) becomes zero under an optimum condition, however, when the learning positions are distant from their respective optimum positions, the measured values of e and u do not become zero, so that the rnq_b and rnq_c calculated along the formula 9 do not become zero. Each of the calculated rnq_b and rnq_c indicates a distance between the actual learning position and the optimum position of the learning position.

Since the A-B phases boundary 37 and the C-D phases boundaries 39 and 40 as actually formed are distant from their respective optimum positions 47, 49 and 48 by $\Delta N0$, $\Delta Qn$ and $\Delta Qp$ respectively, the rnq_b and rnq_c do not become zero. The rnq_b as the averaged value along the circumference of the track indicates a position between the boundaries 47 and 49, and under the arrangement of A-D phases as shown in FIG. 3, indicates a position between the boundaries 37 and 39. When the datum point is the optimum position 47, the rnq_b' is calculated along the following formula 10a. Incidentally, a positive-negative sigh of each of $\Delta N0$ and $\Delta Qn$ is determined on the basis of that a positive sign is attached when the shift of each of $\Delta N0$ and $\Delta Qn$ from the optimum position thereof is in a direction from an outer periphery toward an inner periphery.

$$rnq\_b'=-0.25+\{(\Delta N0+\Delta Qn)/2\} \quad \text{(formula 10a)}$$

Since the rnq_b calculated along the formula 9 from the measuring result as described above becomes zero at one fourth of the track width, by using a relationship of rnq_b=rnq_b'+0.25, the following formula 10b is obtained from the formula 10a.

$$rnq\_b=(\Delta N0+\Delta Qn)/2 \quad \text{(formula 10b)}$$

A width dn between the A-B phases boundary 37 and the C-D phases boundary 39 is calculated along the following formula 10c.

$$dn=0.5+\Delta N0-\Delta Qn \quad \text{(formula 10c)}$$

From the formulas 10c and 10b, dn is calculated from rnq_b along the following formula 10d.

$$dn=0.5-2rnq\_b+2\Delta N0 \quad \text{(10d)}$$

Similarly to rnq_b, The rnq_c as the averaged value along the circumerence of the track indicates a position between the boundaries 47 and 48, and under the arrangement of A-D phases as shown in FIG. 3, indicates a position between the boundaries 37 and 40. When the datum point is the optimum position 47, the rnq_c' is calculated along the following formula 11a. Incidentally, a positive-negative sigh of each of $\Delta N0$ and $\Delta Qp$ is determined on the basis of that a positive sign is attached when the shift of each of $\Delta N0$ and $\Delta Qp$ from the optimum position thereof is in the direction from the outer periphery toward the inner periphery.

$$rnq\_c'=0.25+\{(\Delta N0+\Delta Qp)/2\} \quad \text{(formula 11a)}$$

Since the rnq_c calculated along the formula 9 from the measuring result as described above becomes zero at one fourth of the track width, by using a relationship of rnq_c=rnq_c'-0.25, the following formula 11b is obtained from the formula 11a.

$$rnq\_c=(\Delta N0+\Delta Qp)/2 \quad \text{(formula 11b)}$$

A width dn between the A-B phases boundary 37 and the C-D phases boundary 40 is calculated along the following formula 11c.

$$dp=0.5-\Delta N0+\Delta Qp \quad \text{(formula 11c)}$$

From the formulas 11c and 11b, dp is calculated from rnq_c along the following formula 11d.

$$dp=0.5+2rnq\_c-2\Delta N0 \quad \text{(formula 11d)}$$

The learned rnq_b and rnq_c may be stored in a non-volatile memory. When the learning is performed over all of the recording tracks, an extremely large memory capacity is needed, so as shown in FIG. 6 the learned rnq_b and rnq_c are preferably recorded in the servo sectors.

Figure 5:
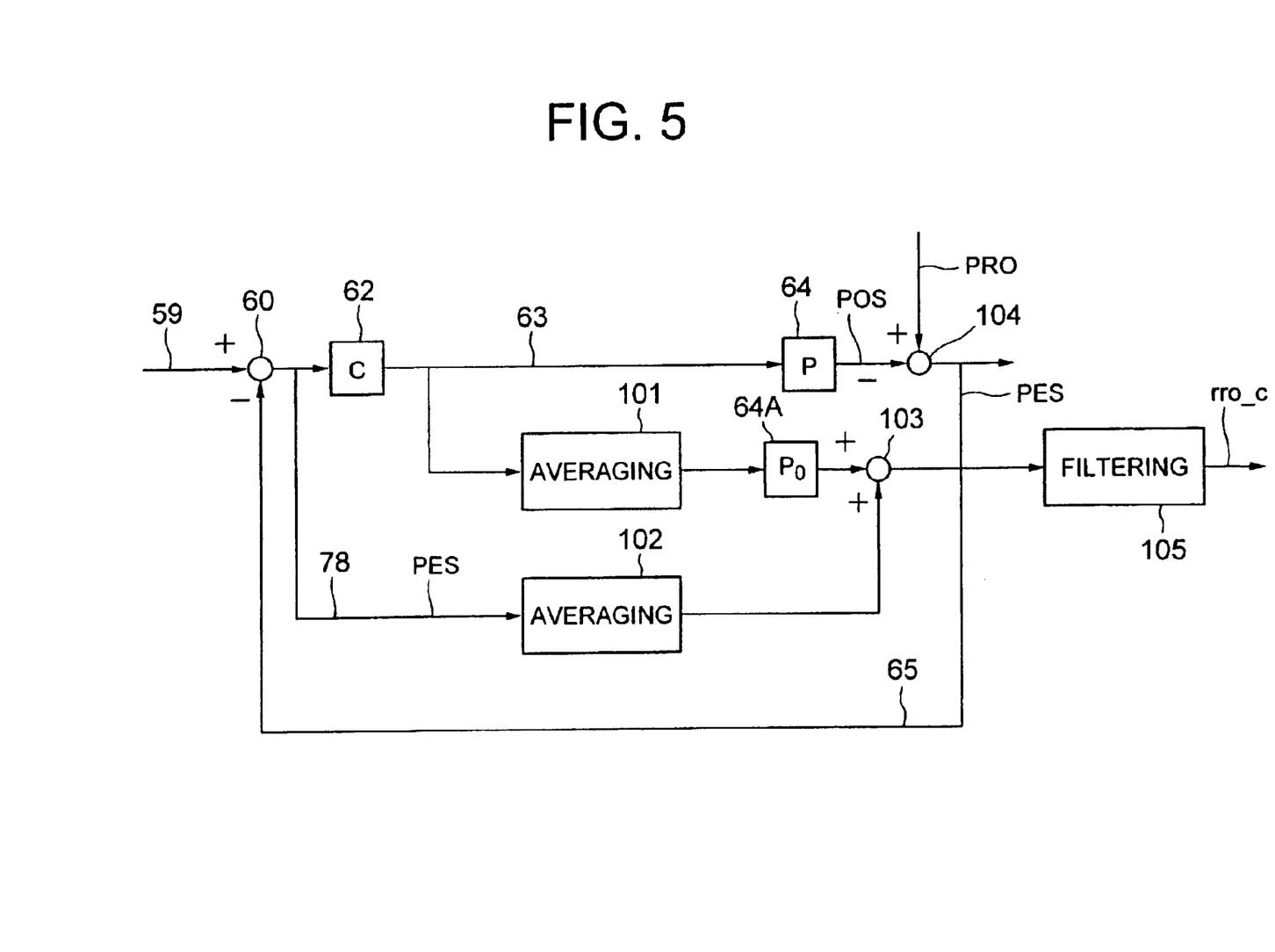
FIG. 5 is a block diagram showing a control system for learning a track center.

The distance $\Delta N0$ between the measured track center 37 (Npos=0) and the optimum track center 47 is learned as follows. In FIG. 5, a track center learning control system, that is, a means for calculating the track center estimating value$\Delta N0$ is shown. The track center learning control system includes a subtracter 60, a phase compensator (c) 62, a head actuator 64 to be controlled, averaging devices 101, 102 each of which averages measured values from respective one of the sectors, a model block 64. corresponding to a model P0 of the head actuator 64, an accumulator 103, a subtracter 104 and a filtering device 105.

In the track center learning control system, Linpos 65 is calculated along the formula 4 from the signal read out by the magnetic head from the previously recorded servo sectors on the magnetic disk 12, a deviation 78 (PES) between Linpos 65 and a target value 59 indicating the track center position is obtained by the subtracter 60, an operating value is calculated by the phase compensator 62 from the deviation 78, and the head actuator 64 is driven in accordance with the operating value so that the positioning control of the magnetic head 1 is performed. During the above track center learning control process, signals 65 and 63 generated in X revolutions are stored, and an averaged value per revolution (revolution synchronous component) of each of the signals 65 and 63 is obtained at each of the servo sectors. The revolution synchronous component of the signal 65 from the averaging device 101 is multiplied by the model block 64. In the accumulator 103, the revolution synchronous component of the signal 65 from the averaging device 102 and the output of the model block 64 are added to each other to be output to the filtering device 105. The filtering device 105 may have a characteristic for removing a low frequency range component, or may be deleted. An output of the filtering device 105 is an estimated value rro_c of the track variation value $\Delta N0$.

As shown in FIG. 6, the result of the learning of the N-Q phases switching boundary is recorded onto or read out from the servo sector 12. The servo sector 12 includes a preamble 66, a servo marker 67, the track number 69, the A-D phases 30–33 as the burst signals, and the compensating value 70 behind the burst signals.

In the present invention, since an improvement of a reliability of writing data on data writing process is intended, the compensating value is recorded at a position from which the compensating value can be read out when data is written onto the recording surface.

FIG. 6 shows a case in which the compensating value is recorded onto the 2n track. When a dual head including the read head 73 and write head 72 is used, the compensating value is recorded at a position 74 from which the compensating value can be read out when data is written onto the recording surface.

The compensating value 70 may include the estimated value rro_c of the track center variation value $\Delta N0$ between the measured track center and the optimum track center as well as the rnq_b and rnq_c obtained from the 2n track. It is preferable for minimizing error during reading out data that the recorded dada includes parity.

Figure 7:
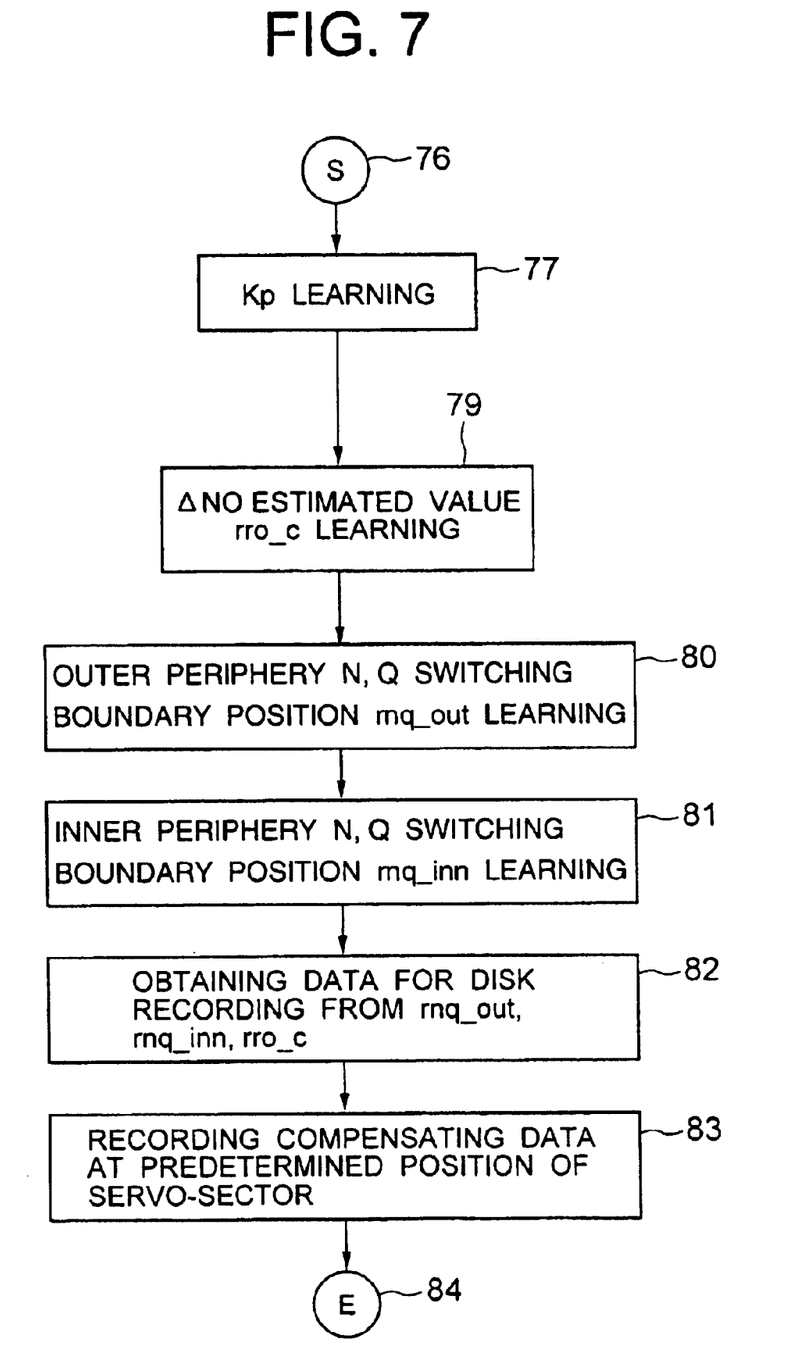
FIG. 7 is a flow chart showing a process for learning on the position of the switching boundary between N and Q phases and producing the positional signal.

In FIG. 7, steps for learning the N-Q phases switching boundary and producing the positional signal are shown. At first, the compensated gain Kp is learned (step 77). The compensated gain Kp is calculated along the formula 3 from the output generated when the head is positioned to the learning position at which the absolute values of Npos and Qpos are equal to each other. Subsequently, the distance value $\Delta N0$ between the measured track center and the optimum track center is learned (step 79).

Thereafter, the head is positioned to the N-Q phases switching boundary at a radially outer side, so that rnq_out as the rnq at the radially outer side is calculated along the formula 9 from the output generated by the head (step 80).

The head is positioned to the N-Q phases switching boundary at a radially inner side, so that rnq_inn as the rnq at the radially inner side is calculated along the formula 9 from the output generated by the head (step 81).

A set of the obtained rnq__out, rnq__inn and rro__c at each of the servo sectors is incorporated into a disk recording data (step 82).

Finally, the compensating value is recorded on a predetermined position of the servo sector (step 83).

The compensating value learned and recorded as described above is read out from the servo sector to produce the linearized positional signal Linpos when the instructed track center is the target position. How to produce Linpos from dn calculated along the formula 10d and dp calculated along the 11d is explained as follows.

In this case, since the distance between the optimum position of Q phase and the actual position of Q phase at each of sides of the track center (Npos=0) opposite to each other is considered, the compensating range covers sufficiently the writing admissible range when the compensating range extends by three fourth (0.75) of the track width (1) from the track center at each of sides of the track center.

A formula 12 for calculating Linpos from dp and dn on the basis of the positive-negative signs of Npos and Qpos and comparison in values thereof is shown below. Since the estimation of the compensating value as described above is performed on the learning positions (b) and (c), in this case Linpos for a range of the recording track of track number 2n+1 is considered, and a value indicating the track number is eliminated from Linpos.

```
        if Npos ≧0
            if Qpos < 0
                if Npos ≧-Qpos
                    Linpos = Qpos + dp
                else
                    Linpos = Npos
                end
            end
        else
            if Qpos < 0
                if -Npos ≧-Qpos
                    Linpos = -Qpos - dp
                else
                    Linpos = Npos
                end
            end
        end         (formula 12)
```

In FIG. 3, a thick solid line 51 shows Linpos calculated along the formula 12, and linearly continuous with respect to the physical actual position at the phase switching boundary. By positioning the head on the basis of Linpos at the position compensated by the track center variation value $\Delta N0$ to write data, a range physically admissible for writing data and a range defined on the basis of the measured positional signal for writing data are equal to each other, so that an off-track writing is restrained to improve a reliability of writing data.

Figure 8:
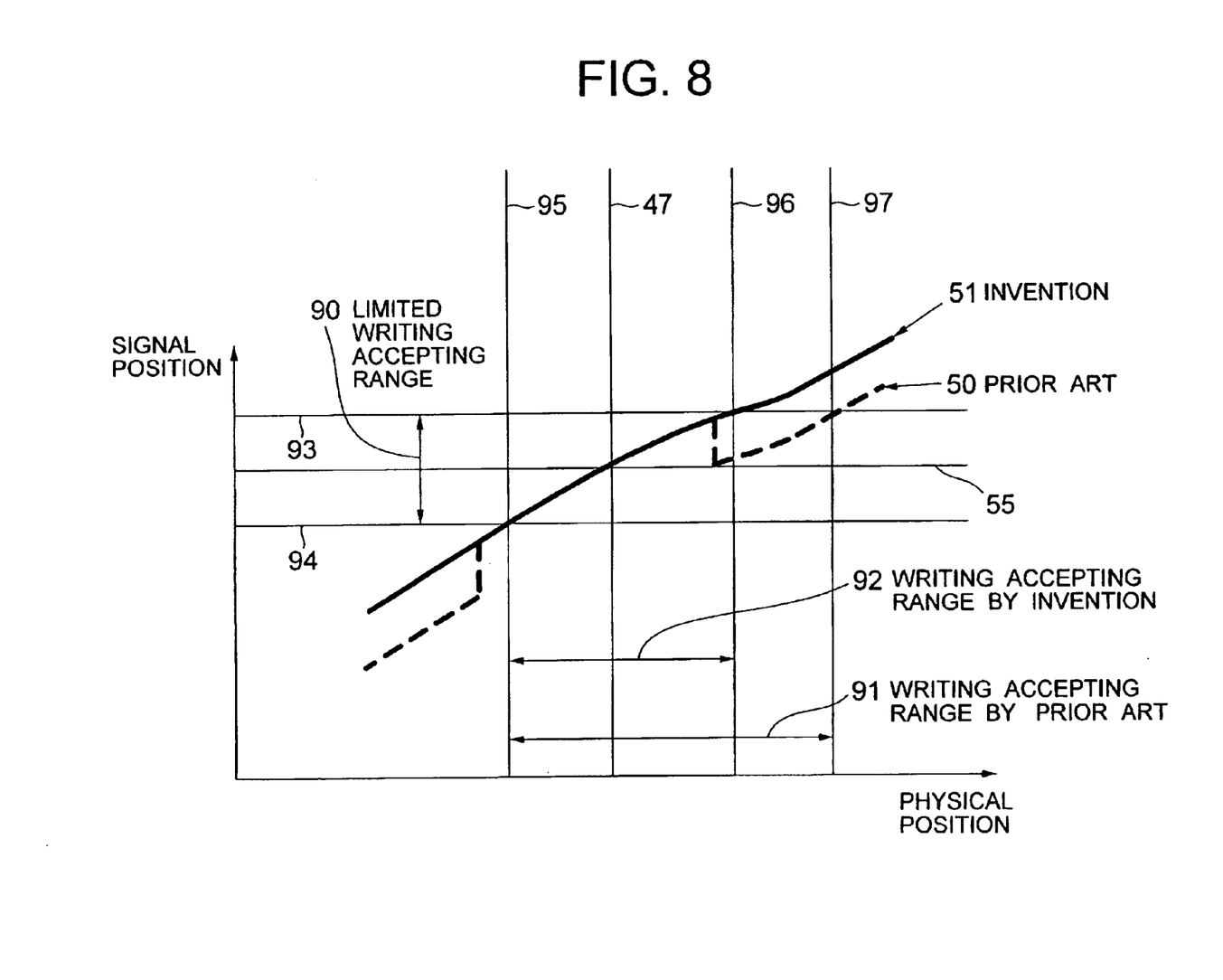
FIG. 8 is a schematic view showing a writing allowing range determined by learning on the position of the switching boundary between N and Q phases and the positional signal producing logic according to the invention and a writing allowing range determined by the prior art.

In FIG. 8, the range defined by using the learning on the N-Q phase switching boundary position and the position signal producing logic of the invention for writing data is shown in comparison with a range defined by the prior art for writing data.

The positional signal corresponding to the track center is denoted by line 55, the track center defined by the positional signal is denoted by line 47, upper and lower limit positional signals corresponding to respective side ends of the recording track admissible for writing data are denoted by lines 93 and 94, and upper and lower limit positions defined by the positional signal admissible for writing data are denoted by lines 95, 96 and 97.

If a positional signal range 90 admissible for writing data 90 is defined as shown, a range 92 admissible for writing data determined on the positional signal 51 of the invention is defined as shown.

In a range 91 admissible for writing data determined on the positional signal 51 of the prior art, the data is allowed to be written at a position other than the predetermined admissible range for writing data, so that the off-track writing is not prevented.

From the formula 12, it is understandable that by the compensating values dq and dn obtained according to the invention, an accuracy of the linearized positional signal Linpos is improved. Each of the compensating values dq and dn may be obtained from $\Delta N0$ and respective one of $\Delta Qn$ and $\Delta Qp$ along respective one of the formula 10c and 11c. Similarly to estimating $\Delta N0$ as described above, $\Delta Qn$ and $\Delta Qp$ can be estimated, while the track side end boundary 39 (Qpos=0) is a target position (2n+0.5) at which the head is to be positioned for estimating $\Delta Qn$ and the track side end boundary 40 (Qpos=0) is a target position (2n+1.5) at which the head is to be positioned for estimating $\Delta Qp$, although in FIG. 5, the track center 37 (Npos=0) is a target position (2n+0.5) at which the head is to be positioned. Along the formula 12, the linearized positional signal Linpos can be obtained correctly from dq and dn calculated along respective one of the formula 10c and 11c from $\Delta N0$ and respective one of $\Delta Qn$ and $\Delta Qp$.

The method for obtaining the linearized positional signal Linpos usable when the magnetic head is positioned at the track center of track number 2n+1 in FIG. 2 is described. The linearized positional signal Linpos usable when the magnetic head is positioned at the track center of track number 2n can be obtained by obtaining a distance between the track center 36 and each of the track side end boundaries 39 and 41.

When the magnetic head is positioned at the track side end boundary 39 between the recording tracks 2n and 2n+1, the head is positioned at a target position (2n+0.5) to obtain a distance between the track side end boundary 39 and each of the track centers 36 and 37. When the magnetic head is positioned at the track side end boundary 40 between the recording tracks 2n+1 and 2n+2, the head is positioned at a target position (2n+1.5) to obtain a distance between the track side end boundary 40 and each of the track centers 37 and 38.

According to the invention, since the positional signal changes continuously with respect to the actual physical position at the phase switching position, the range admissible physically for the data writing and the range in which the data writing is allowed in accordance with the detected positional signal conform to each other so that a reliability of the data writing is improved.

Decreasing a time period for learning on the N-Q phases switching boundary position rnq while maintaining the compensating accuracy is important for decreasing a production cost. It is most effective for decreasing a time period for learning on the N-Q phases switching boundary position rnq that a number of times of averaging processings for obtaining the rotationally synchronous vibration on learning is decreased.

On the other hand, if the number of times of averaging processings is decreased, non-synchronous vibration component is not sufficiently condensed during the processing, the rotationally synchronous vibration and the non-synchronous vibration component are overlaid each other. Therefore, by preventing the learning from being performed in a frequency range in which the non-synchronous vibration component is relatively great, the learning accuracy is restrained from being deteriorated by decreasing the number of times of averaging processings.

Before or after the averaging processing during the learning, according to the invention, the non-synchronous vibration component obtained in the frequency range in which the non-synchronous vibration component is relatively great is eliminated by a filter of linear phase characteristic. For a characteristic of filtering gain, a high-pass filter for eliminating a component obtained in a low frequency range or a band-stop filter for eliminating a signal obtained in the specified frequency range is which the non-synchronous vibration component is relatively great is preferably usable.

When as this learning process a real time processing is not required, for the characteristic of filtering gain, the filter of linear phase characteristic is optimum for synchronous vibration estimation with zero phase error, because a group delay time is constant over the whole of the frequency range.

When the synchronous vibration of signal passing band is learned by the filter of linear phase characteristic without the phase error in a small number of times of averaging processings so that an erroneous estimation of non-synchronous vibration component in the low frequency range is prevented, the value of rnq can be learned correctly in a relatively shorter learning time period.

In a servo track writing of self STW type in which a track pitch is defined on the basis of a head width for writing without an external positioning device, since a positioning signal for writing the servo sector corresponds to a variation of track pitch, the positioning signal is recorded in the servo sector to eliminate the learning time so that the processing can be performed in a short time period.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A positioning control apparatus for controlling a movement of a movable object to be positioned at a target position on a surface while estimating an actual position of the movable object on the surface on the basis of signals which signals are generated by the movable object and a value of each of which signals varies in accordance with a distance between the movable object and respective one of positional marks of at least two phases which are distant from each other on the surface, comprising, an object driver for driving the movable object to be positioned at the target position on the surface, and a sensor to be included by the movable object to generate the signals, wherein the surface includes a first range in which the actual position of the movable object is adapted to be estimated as a distance between the movable object and first one of the positional marks and a second range in which the actual position of the movable object is adapted to be estimated as a distance between the movable object and second one of the positional marks, and a distance data on the basis of which distance data an actual distance between the first one of the positional marks and the second one of the positional marks varying in accordance with a positional error in writing the positional marks onto the surface is adapted to be estimated is recorded in the positioning control apparatus.

2. A positioning control apparatus according to claim 1, further comprising a substrate including the surface, wherein the distance data is recorded in the substrate.

3. A positioning control apparatus according to claim 1, further comprising a memory device for recording therein the distance data.

4. A positioning control apparatus according to claim 1, wherein the distance data corresponds to a difference between a nominal distance between the first one of the positional marks and the second one of the positional marks and an actual distance between the first one of the positional marks and the second one of the positional marks.

5. A positioning control apparatus according to claim 1, wherein the distance data corresponds to a combination of an actual distance between the first one of the positional mark and a boundary between the first and second ranges and an actual distance between the second one of the positional mark and the boundary between the first and second ranges.

6. A positioning control apparatus according to claim 1, wherein the distance data corresponds to an actual distance between one of the positional marks and a boundary between the first and second ranges when the boundary is set in such a manner that a distance between the first one of the positional mark and the boundary and a distance between the second one of the positional mark and the boundary are equal to each other.

7. A positioning control apparatus according to claim 1, wherein the distance data corresponds to twice an actual distance between one of the positional marks and a boundary between the first and second ranges when the boundary is set in such a manner that a distance between the first one of the positional mark and the boundary and a distance between the second one of the positional mark and the boundary are equal to each other.

8. A positioning control apparatus according to claim 1, wherein the distance data includes a component corresponding to an actual distance between one of the positional marks and a boundary between the first and second ranges, and the component corresponds to the value of one of the signals which value is variable in accordance with the distance between the movable object and the one of positional marks and is obtainable when the target position at which the movable object is positioned is the boundary.

9. A positioning control apparatus according to claim 1, wherein the distance data includes a component corresponding to an actual distance between one of the positional marks and a boundary between the first and second ranges, and the component corresponds to an average of the values of one of the signals each of which values is variable in accordance with the distance between the movable object and the one of positional marks and is obtainable at respective one of a plurality of times of generating the one of the signals when the target position at which the movable object is positioned is the boundary.

10. A positioning control apparatus according to claim 1, wherein the distance data corresponds to an actual distance between one of the positional marks and a boundary between the first and second ranges when the boundary is set in such a manner that an absolute value of one of the signals and an absolute value of the other one of the signals become equal to each other when the target position at which the movable object is positioned is the boundary.

11. A positioning control apparatus according to claim 1, wherein the distance data corresponds to twice an actual distance between one of the positional marks and a boundary between the first and second ranges when the boundary is set in such a manner that an absolute value of one of the signals and an absolute value of the other one of the signals become equal to each other when the target position at which the movable object is positioned is the boundary.

12. A positioning control apparatus according to claim 1, wherein the distance data corresponds to a combination of actual distances between the first one of the positional mark and the movable object and between the second one of the positional mark and the movable object measurable when the target position at which the movable object is positioned is set between the first one of the positional mark and the second one of the positional mark to generate the signals, values of which signals vary respectively in accordance with the actual distances between the first one of the positional mark and the movable object and between the second one of the positional mark and the movable object.

13. A positioning control apparatus according to claim 12, wherein the target position at which the movable object is positioned is a boundary between the first and second ranges.

14. A positioning control apparatus according to claim 13, wherein the boundary is set in such a manner that an absolute value of one of the signals and an absolute value of the other one of the signals become equal to each other at the boundary.

15. A positioning control apparatus according to claim 14, wherein a distance between the N-zero position at which the N head positioning signal is actually zero and an optimum N-zero position at which the N head positioning signal is zero is calculated from a deviation which is obtained when positioning the magnetic head to the N-zero position as the target value, the distance between the N-zero position and the Q-zero position adjacent to the N-zero position is calculated from the distance between the N-zero position and the optimum N-zero position and the estimated value of the boundary position, and the positioning signal for the head is compensated by the distance between the N-zero position and the Q-zero position adjacent to the N-zero position.

16. A positioning control apparatus according to claim 12, wherein each of the actual distances is determined on the basis of an average of the values of respective one of the signals each of which values is variable in accordance with the distance between the movable object and respective one of positional marks and is obtainable at respective one of a plurality of times of generating the respective one of the signals when the target position at which the movable object is positioned is a boundary between the first and second ranges.

17. A positioning control apparatus according to claim 1, further comprising,
a positional error signal calculating device for calculating from the signals generated by a magnetic head as the sensor a positional signal corresponding to a positional relationship between the positional mark prerecorded on the surface of a magnetic disk and the magnetic head for recording information onto the magnetic disk or reading out the information from the magnetic disk and a positional error signal corresponding to a difference between an actual position of the magnetic head and the target position of the magnetic head,
an operating value calculating device for calculating an operating value on the basis of the positional error signal, and
a positioning device for positioning the magnetic head at the target position on the basis of the operating value,
wherein the positioning control apparatus further comprises a boundary position calculating device for calculating a distance between actual and optimum positions at which absolute values of N and Q head positioning signals as said signals whose amplitudes vary cyclically in accordance with the position of the magnetic head and whose phases are different from each other by 90 degrees are equal to each other, from a deviation of the position of magnetic head to a target value, where the head position is obtained by the sum or subtraction of values of N and Q head positioning signals.

18. A positioning control apparatus according to claim 17, wherein an estimated value of the boundary position is read out as the prerecorded distance between the actual and optimum positions at which the absolute values of N and Q head positioning signals are equal to each other when the positioning device positions the magnetic head in the range in which the N head positioning signal has the linearity, a distance between a N-zero position at which the N head positioning signal is zero and a Q-zero position which is adjacent to the N-zero position and at which the Q head positioning signal is zero is calculated from the estimated value of said boundary position, and the positioning signal for said head is compensated by the distance between the N-zero position and the Q-zero position.

19. A positioning control apparatus according to claim 17, wherein the boundary position calculating device calculates the distance between the actual position at which the absolute values of N and Q head positioning signals are equal to each other and the optimum position at which the absolute values of N and Q head positioning signals should be equal to each other, with performing at least one of band-pass filtering treatment and band-stop filtering treatment on the deviation of the actual position of the magnetic head with respect to the target value of zero which deviation is obtained when controlling the magnetic head to be positioned at the boundary between the ranges in which the N and Q head positioning signals have respective linearities so that the absolute values of N and Q head positioning signals become equal to each other.

20. A positioning control apparatus according to claim 17, wherein the boundary position calculating device calculates a total amount of the distance between the actual position at which the absolute values of N and Q head positioning signals are equal to each other and the optimum position at which the absolute values of N and Q head positioning signals should be equal to each other, and deviations of averaged absolute values of the N and Q head positioning signals with respect to one fourth of a track width which N and Q head positioning signals are obtained when controlling the magnetic head to be positioned at the boundary between the ranges in which the N and Q head positioning signals have respective linearities so that the absolute values of N and Q head positioning signals become equal to each other.

21. A positioning control apparatus according to claim 1, further comprising,
a positional error signal calculating device for calculating from the signals generated by a magnetic head as the sensor a positional signal corresponding to a positional relationship between the positional mark prerecorded on the surface of a magnetic disk and the magnetic head for recording information onto the magnetic disk or reading out the information from the magnetic disk and a positional error signal corresponding to a difference between an actual position of the magnetic head and the target position of the magnetic head,
an operating value calculating device for calculating an operating value on the basis of the positional error signal, and a positioning device for positioning the magnetic head at the target position on the basis of the operating value, wherein the positioning control apparatus further comprises a position calculating device for calculating a radial position of the magnetic head on the magnetic disk from N and Q head positioning signals as said signals whose amplitudes vary cyclically in accordance with the position of the magnetic head and whose phases are different from each other by 90 degrees, wherein a first distance between an actual position at which N head positioning signal is zero and an optimum position at which N head positioning signal should be zero is calculated from a deviation of an actual position of the magnetic head with respect to a first target position at which N head positioning signal is zero while the deviation is obtained when the magnetic head is controlled to be positioned at the target position, a second distance between an actual position at which Q head positioning signal is zero adjacently to the actual position at which N head positioning signal is zero and an optimum position at which Q head positioning signal should be zero is calculated from a deviation of an actual position of the magnetic head with respect to a second target position at which Q head positioning signal is zero while the deviation is obtained when the magnetic head is controlled to be positioned at the second target position, a compensating distance between the actual position at which N head positioning signal is zero and the actual position at which Q head positioning signal is zero adjacently to the actual position at which N head positioning signal is zero is calculated from the first and second distances, and the positional signal of the magnetic head is compensated with using the compensating distance.

* * * * *